(12) United States Patent
Suzuki (10) Patent No.: US 10,788,119 B2
(45) Date of Patent: Sep. 29, 2020

(54) DIFFERENTIAL DEVICE (71) Applicant: Honda Motor Co., Ltd., Tokyo (JP)

(72) Inventor: Kazushige Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 16/280,053

(22) Filed: Feb. 20, 2019

(65) Prior Publication Data
US 2019/0271386 A1 Sep. 5, 2019

(30) Foreign Application Priority Data

Mar. 2, 2018 (JP) .................................. 2018-037489

(51) Int. Cl.
*F16H 57/04* (2010.01)
*F16H 48/08* (2006.01)
*F16H 48/40* (2012.01)

(52) U.S. Cl.
CPC ......... *F16H 57/0427* (2013.01); *F16H 48/08* (2013.01); *F16H 48/40* (2013.01); *F16H 57/04* (2013.01); *F16H 57/0483* (2013.01); *F16H 2048/085* (2013.01)

(58) Field of Classification Search
CPC .. F16H 57/0495; F16H 57/08; F16H 57/0427; F16H 57/0483; F16H 37/08; F16H 48/40
See application file for complete search history.

(56) References Cited

U.S. PATENT DOCUMENTS

| | | | | |
|---|---|---|---|---|
| 1,874,646 | A * | 8/1932 | Skinner | F16H 57/0427 184/13.1 |
| 7,850,567 | B2 * | 12/2010 | Kramer | F16D 13/52 192/70.12 |
| 7,976,421 | B2 * | 7/2011 | Nakajima | F16H 48/08 475/160 |
| 9,856,972 | B2 * | 1/2018 | Mori | F16H 57/0483 |
| 2019/0271387 | A1 * | 9/2019 | Kito | B60K 1/00 |
| 2019/0293169 | A1 * | 9/2019 | Kawaguchi | B60K 1/00 |

FOREIGN PATENT DOCUMENTS

| | | | | |
|---|---|---|---|---|
| JP | 2005008143 | | 1/2005 | |
| JP | 2010254186 | A * | 11/2010 | ............... B60K 1/00 |
| JP | 2013127280 | | 6/2013 | |

* cited by examiner

*Primary Examiner* — Patrick Cicchino
(74) *Attorney, Agent, or Firm* — JCIPRNET (57) ABSTRACT

The disclosure provides a differential device. The differential device having a configuration in which a pinion shaft is inserted into and fixed to a differential case that is driven to rotate around a first axis in a second axis direction orthogonal to the first axis, a pair of pinion gears that are rotatably supported by the pinion shaft and a pair of side gears that are meshed with the pinion gears and are supported so that they are rotatable around the first axis are accommodated in the differential case, and rotational power input from a driving source (engine) to the differential case is distributed to left and right rear wheels (drive wheels) WR through a pair of left and right axles connected to the pair of side gears, wherein an opening is formed at the differential case and oil scraping-off plates are attached to the differential case.

8 Claims, 6 Drawing Sheets

DIFFERENTIAL DEVICE

CROSS-REFERENCE TO RELATED APPLICATION

This application claims the priority of Japan patent application serial no. 2018-037489, filed on Mar. 2, 2018. The entirety of the above-mentioned patent application is hereby incorporated by reference herein and made a part of this specification.

BACKGROUND

Technical Field

The disclosure relates to a differential device for distributing rotational power from a driving source of a vehicle to a pair of right and left driving wheels.

Description of Related Art

In a power transmission path of a vehicle, a differential device (differential mechanism) for distributing rotational power from a driving source to a pair of right and left driving wheels is provided. In the differential device, in a differential case that is driven to rotate around a first axis, a pinion shaft is inserted and fixed in a second axis direction orthogonal to the first axis, and in the differential case, a pair of pinion gears that are rotatably supported on the pinion shaft and a pair of side gears that are meshed with the pinion gears and are supported so that they are rotatable around the first axis are accommodated (for example, refer to Patent Document 1).

Incidentally, in the differential device, in order to prevent power loss due to friction between the pair of pinion gears and the side gears meshed with each other accommodated in the differential case and deterioration of durability due to wear, it is desirable to supply a lubricating oil into the differential case. When oil is forcibly supplied into the differential case by an oil pump, since the oil pump and oil pipes are necessary for the supply, there are problems of the structure becoming complicated and costs increasing.

In addition, as another lubrication method, an oil bath (oil tub) system in which a rotation sliding part is immersed in oil that has accumulated on a bottom of a housing and the rotation sliding part is lubricated is conceivable. However, the oil bath system has problems of increased drag resistance particularly during high-speed rotation and power loss.

Therefore, during high-speed rotation, oil that has accumulated on the bottom of the housing is scraped up, and moved to an oil tank disposed at the top, an amount of oil on the bottom of the housing is reduced, an oil level is lowered, and the drag resistance due to rotation of the rotation sliding part is reduced. For example, Patent Document 2 proposes a configuration in which, in a planetary gear mechanism, a plurality of blade type scraping-up members are provided on the outer circumference of a straightening ring attached to a carrier, and oil is scraped up by the scraping-up members that rotate together with the carrier and moved to an oil tank.

Patent Documents

[Patent Document 1] Japanese Laid-open No. 2013-127280
[Patent Document 2] Japanese Laid-open No. 2005-008143

However, it is difficult to directly apply the configuration proposed in Patent Document 2 to a differential device, and ideas for realizing specific configurations are necessary.

SUMMARY

One of the embodiments of the disclosure provides a differential device having a configuration in which a pinion shaft is inserted and fixed to a differential case that is driven to rotate around a first axis in a second axis direction orthogonal to the first axis, a pair of pinion gears that are rotatably supported by the pinion shaft and a pair of side gears that are respectively meshed with the pinion gears and are supported so that they are rotatable around the first axis are accommodated in the differential case, and rotational power input from a driving source to the differential case is distributed to left and right drive wheels through a pair of left and right axles respectively connected to the pair of side gears, wherein at least one opening is formed at the differential case and a plurality of oil scraping-off plates are attached to the differential case.

Here, in one of the embodiments of the disclosure, the opening may be formed at the differential case in a third axis direction orthogonal to the first axis and the second axis, and the oil scraping-off plates may be attached to an outer circumference of the differential case in the second axis direction.

In addition, in one of the embodiments of the disclosure, the at least one opening may include two openings formed at two opposing parts of the differential case, and the oil scraping-off plates may be attached to two parts on an outer circumference of the differential case in a direction in which the pinion shaft is inserted.

In addition, in one of the embodiments of the disclosure, the oil scraping-off plates may be attached to the differential case with the pinion shaft.

Here, in this case, the pinion shaft may be separated into two pieces in an axial direction, both of the separate pieces may be connected to each other by concave-convex fitting, the oil scraping-off plates inserted into the separate pieces may be interposed between a shaft end head of the separate pieces and the differential case and may be attached to the differential case.

In addition, in one of the embodiments of the disclosure, each of the separate pieces of the pinion shaft may be fixed to the differential case with a retaining pin that is fitted into the differential case from a direction orthogonal to the separate pieces.

BRIEF DESCRIPTION OF THE DRAWINGS

FIG. 3($a$) and FIG. 3($b$) are perspective views of the differential device according to the disclosure, FIG. 3($a$) shows a state before an oil scraping-off plate is attached, and FIG. 3($b$) is a diagram showing a state in which an oil scraping-off plate is attached.

FIGS. 4($a$) and 4($b$) are diagrams showing a lubricating action of the differential device according to the disclosure in the direction of an arrow A in FIG. 3($b$).

FIG. 5($a$) is a front view of one separate piece of a pinion shaft and FIG. 5($b$) is a cross-sectional view taken along the line B-B in FIG. 5($a$).

DESCRIPTION OF THE EMBODIMENTS

One of the embodiments of the disclosure provides a differential device that can lubricate the inside of a differential case simply and at low cost according to a natural oil supply system using rotation of the differential case.

According to one of the embodiments of the disclosure, the oil scraping-off plates are attached to the differential case, a lubricating oil that has accumulated on a bottom of a housing is scraped up by the oil scraping-off plates that rotate together with the differential case, and thus the scraped-up oil is supplied from the opening formed at the differential case into the differential case and is able to be used to lubricate respective parts. In this manner, since the inside of the differential case is lubricated using rotation of an existing differential case, it is possible to simplify the lubrication structure and reduce costs compared to a forcible oil supply system using an oil pump.

In one of the embodiments, since the oil scraping-up plates are attached to the differential case using an existing pinion shaft (separate piece), there is no need to provide a dedicated attachment part for attaching oil scraping-up plates, the number of components is reduced, and it is possible to further simplify the structure of the differential device and reduce costs.

According to the disclosure, it is possible to lubricate the inside of the differential case of the differential device simply and at low cost according to a natural oil supply system using rotation of the differential case.

An embodiment of the disclosure will be described below with reference to the appended drawings.

Figure 1:
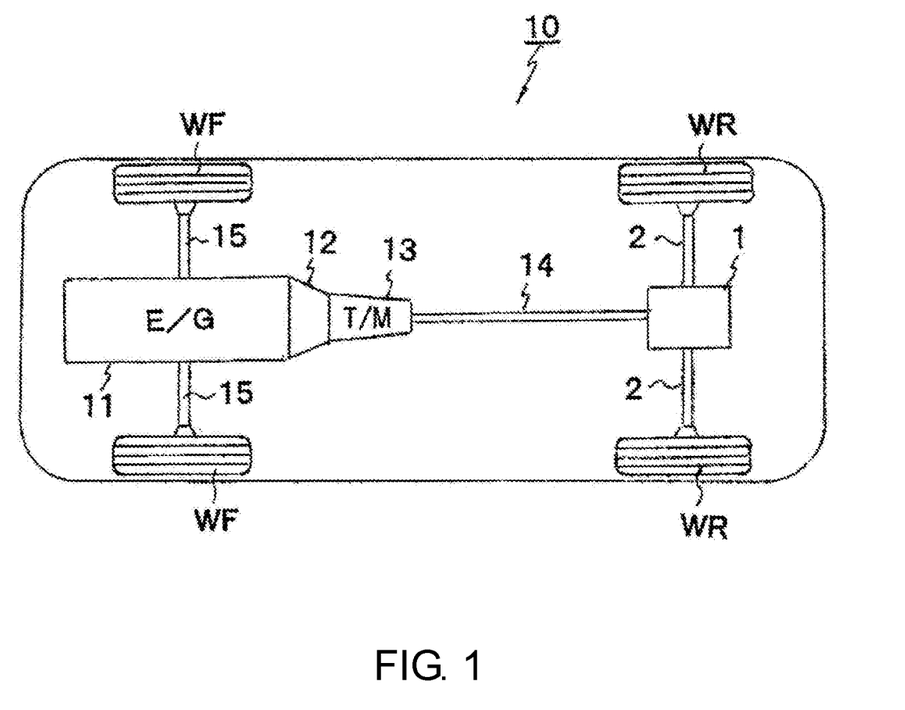
FIG. 1 is a plan view schematically showing a basic configuration of a vehicle including a differential device according to the disclosure.

FIG. 1 is a plan view schematically showing a basic configuration of a vehicle including a differential device according to the disclosure, and a vehicle 10 shown uses an FR system (front engine and rear wheel drive system), and includes an engine (E/G) 11 as a driving source on the front part (the left end in FIG. 1). Here, a torque converter 12 and a transmission (T/M) 13 are sequentially connected to the engine 11, and a propeller shaft 14 linearly extends from the transmission 13 toward the rear of the vehicle (the right side in FIG. 1) with respect to the center of a vehicle body in the width direction.

The rear end of the propeller shaft 14 is connected to a differential device 1 according to the disclosure, left and right axles (rear axles) 2 horizontally extend from the differential device 1 toward outside in the vehicle width direction, and rear wheels WR as drive wheels are attached to outer ends of the axles 2. Here, at the front part of the vehicle 10, left and right axles (front axles) 15 are disposed parallel to the axle 2 at the rear part, and front wheels WF as steering wheels are attached to outer ends of the axles 15.

The engine 11 is an internal combustion engine that converts thermal energy generated by combustion of a fuel into rotational movement of a crankshaft (not shown), and rotation of the crankshaft is transmitted to the left and right rear wheels WR through the torque converter 12, the transmission 13, the propeller shaft 14, the differential device 1, and the left and right axles 2, and the rear wheels WR are driven to rotate at a predetermined speed, and the vehicle 10 travels on the road surface.

The torque converter 12 is disposed between the engine 11 and the transmission 13 in a vehicle longitudinal direction, and has a function as a clutch that intermittently transmits rotational power (rotation torque) output from the engine 11 to the transmission 13 using the viscosity of a working fluid such as oil, and a function of increasing the rotational power and transmitting it to the transmission 13.

The transmission 13 is disposed between the torque converter 12 and the propeller shaft 14 in the vehicle longitudinal direction, and includes, for example, a plurality of transmission gears corresponding to respective variable speed levels including six forward speed levels (the first level to the sixth level) and one backward speed level. Here, the transmission 13 drives and controls a hydraulic control device (not shown) based on an instruction signal from electronic control unit (ECU, not shown) as a control device, and thus performs an operation of shifting to a high speed level from a low speed level (shift up) or an operation of shifting to a low speed level from a high speed level (shift down).

The propeller shaft 14 is disposed between the transmission 13 and the differential device 1 in the vehicle longitudinal direction, and functions as a propeller shaft that transmits rotational power output from the engine 11 toward the rear wheels WR.

The differential device 1 according to the disclosure distributes rotational power that is output from the engine 11 and transmitted through the torque converter 12, the transmission 13, and the propeller shaft 14 to the left and right rear wheels WR through the pair of left and right axles 2. Here, details of the configuration of the differential device 1 will be described below with reference to FIG. 2 to FIG. 7.

Figure 2:
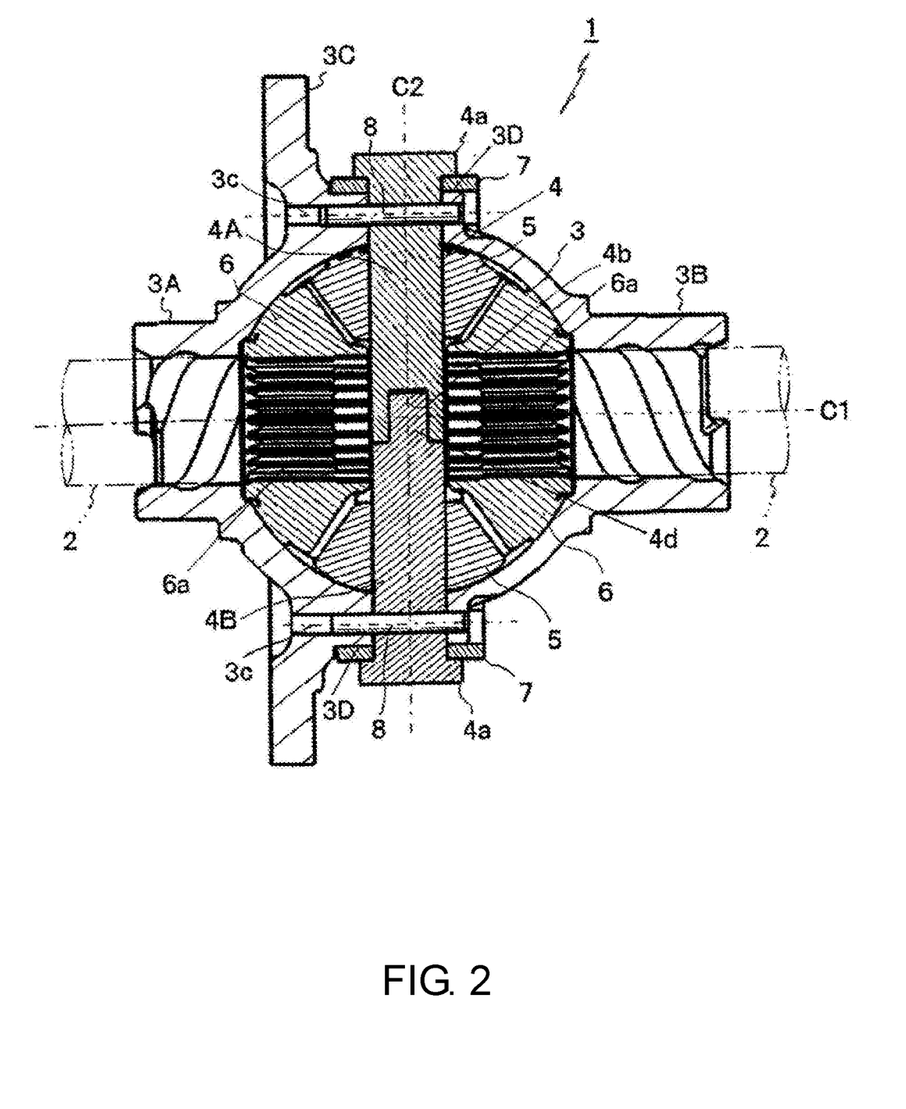
FIG. 2 is a longitudinal cross-sectional view of the differential device according to the disclosure.
Figure 3A:
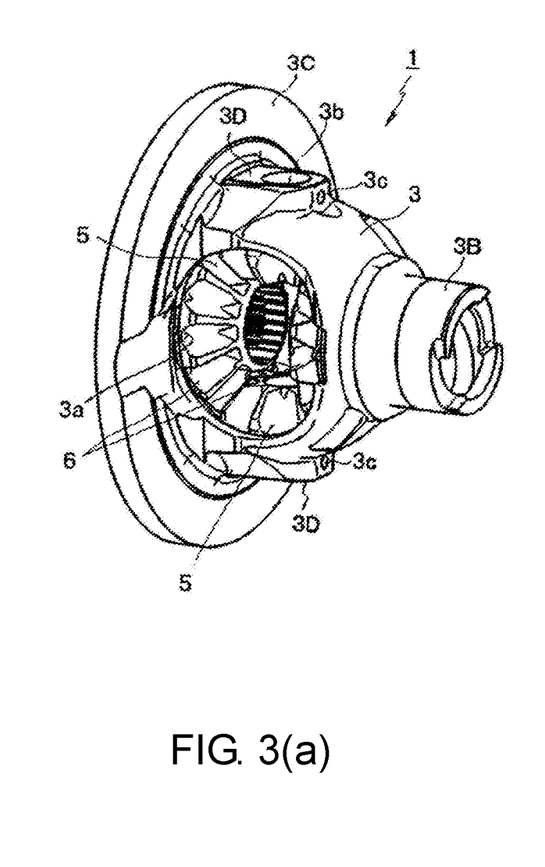
Figure 3B:
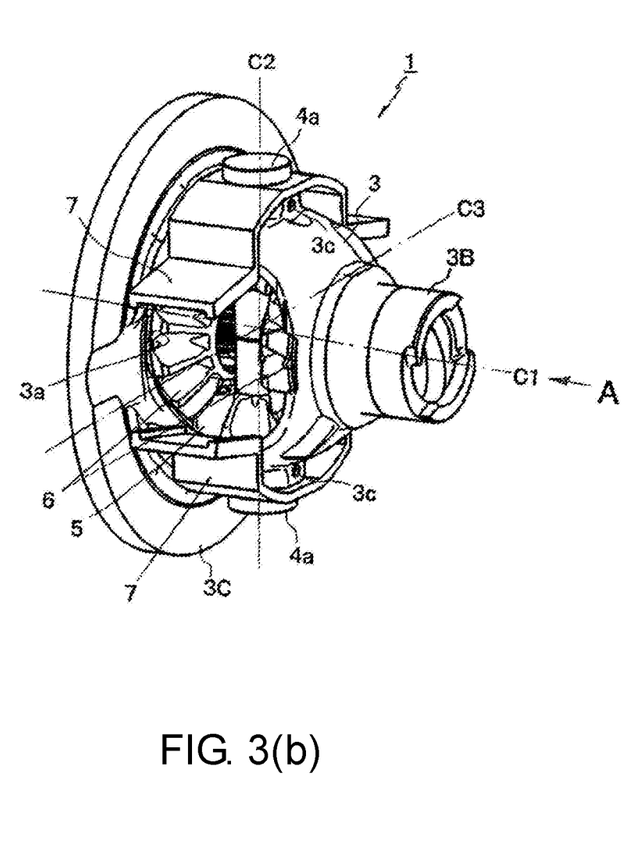
Figure 4A:
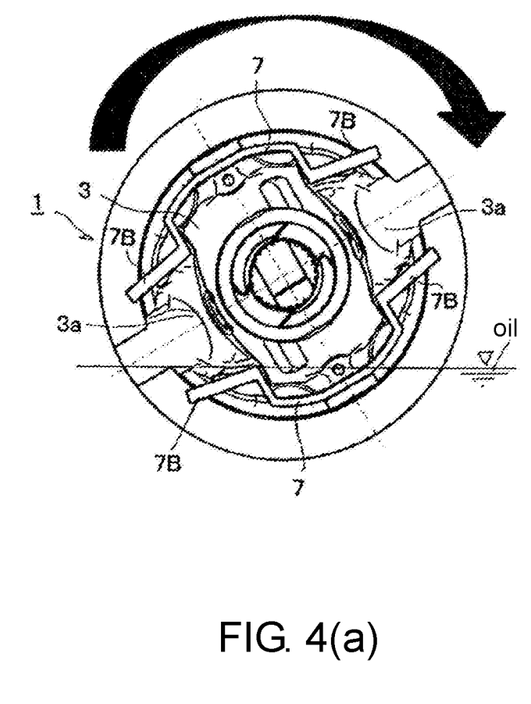
Figure 4B:
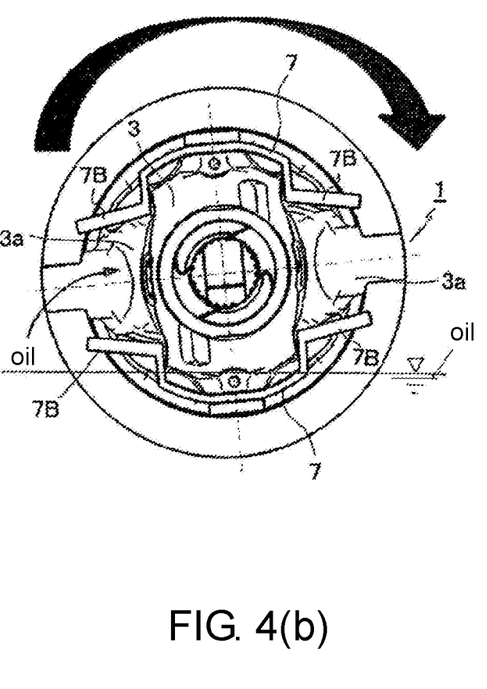
Figure 5A:
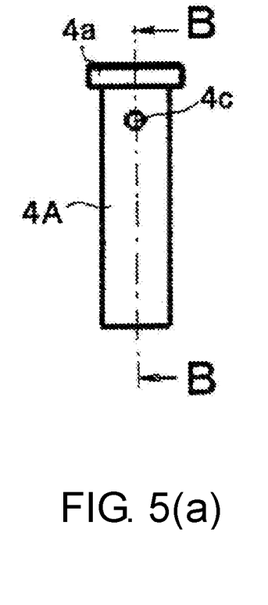
Figure 5B:
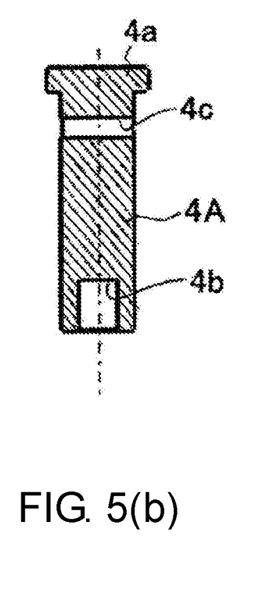
Figure 6A:
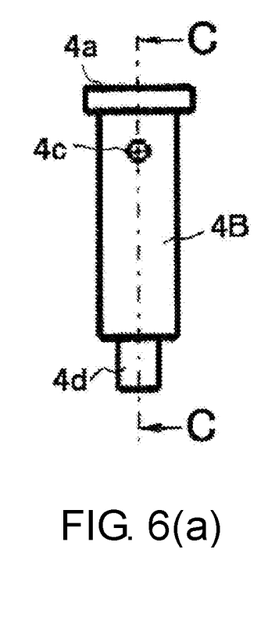
FIG. 6(a) is a front view of the other separate piece of the pinion shaft and FIG. 6(b) is a cross-sectional view taken along the line C-C in FIG. 6(a).
Figure 6B:
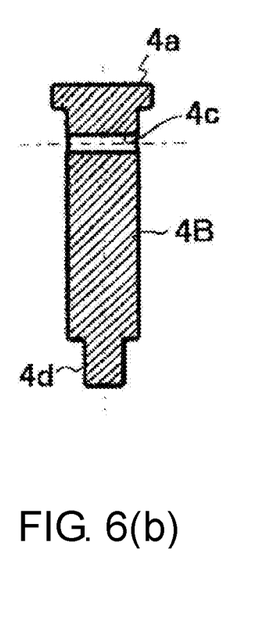
Figure 7:
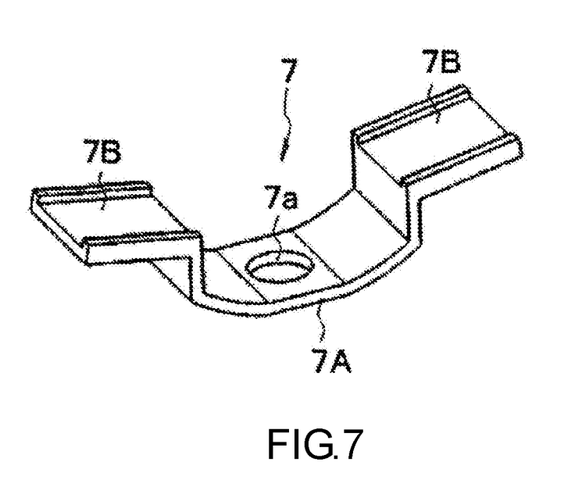
FIG. 7 is a perspective view of the oil scraping-off plate.

FIG. 2 is a longitudinal cross-sectional view of a differential device according to the disclosure, FIG. 3(a) and FIG. 3(b) are perspective views of the same differential device, FIG. 3(a) is a state before an oil scraping-off plate is attached, and FIG. 3(b) is a diagram showing a state in which an oil scraping-off plate is attached. FIGS. 4(a) and 4(b) are diagrams showing a lubricating action of the same differential device in the direction of an arrow A in FIG. 3(b). FIG. 5(a) is a front view of one separate piece of the pinion shaft, FIG. 5(b) is a cross-sectional view taken along the line B-B in FIG. 5(a), FIG. 6(a) is a front view of the other separate piece of the pinion shaft, FIG. 6(b) is a cross-sectional view taken alone the line C-C in FIG. 6(a), and FIG. 7 is a perspective view of the oil scraping-off plate.

The differential device 1 according to the disclosure is accommodated in a housing (not shown), and a lubricating oil accumulates on a bottom of the housing (refer to FIGS. 4(a), 4(b)). Here, the differential device 1 has a shell-like differential case 3 that is driven to rotate around a first axis C1 in the vehicle width direction (the left to right direction in FIG. 2).

In the differential case 3, as shown in FIG. 2, cylindrical shaft insertion parts 3A and 3B into which the left and right axles 2 are inserted protrude together in the direction of the first axis C1 (the left to right direction in FIG. 2). In addition, on the outer circumference of the differential case 3, a ring-shaped flange part 3C that stands upright in the vertical direction in FIG. 2 is integrally formed. In the flange part 3C, a ring gear (not shown) for inputting rotational power output from the engine 11 shown in FIG. 1 to the differential case 3 is attached. Here, the differential case 3 is supported so that it is rotatable around the first axis C1 when the left and right shaft insertion parts 3A and 3B are supported in the housing by bearings (not shown).

In addition, as shown in FIG. 2, a pinion shaft 4 is inserted into and fixed to the central part of the differential case 3 in a second axis C2 direction (the vertical direction in FIG. 2)

orthogonal to the first axis C1, and a pair of pinion gears (bevel gears) 5 that are rotatably supported by the pinion shaft 4 and a pair of side gears 6 that are meshed with the pinion gears 5 and supported so that they are rotatable around the first axis C1 are accommodated in the differential case 3. Here, the pair of pinion gears 5 are disposed in the differential case 3 on the upper and lower sides in FIG. 2, and the pair of side gears 6 are disposed on the left and right sides with the pinion shaft 4 therebetween.

On the inner circumference of the pair of side gears 6, as shown in FIG. 2, a plurality of spline teeth 6a are formed over the entire circumference, and these spline teeth 6a are fitted into a plurality of spline grooves (not shown) formed on the outer circumference of inner ends of the left and right axles 2 that have been passed through the left and right shaft insertion parts 3A and 3B of the differential case 3 and thus the inner ends of the left and right axles 2 are spline-fitted to the central parts of the left and right side gears 6. Therefore, the side gears 6 and the left and right axles 2 rotate together around the first axis C1.

Here, in the differential device 1 according to the present embodiment, as shown in FIG. 3(a) and FIG. 3(b), openings 3a having circular hole shape are formed to face each other at two parts (two parts on both left and right sides) in a third axis C3 direction orthogonal to the first axis C1 and the second axis C2 of the differential case 3.

In addition, as shown in FIG. 2 to FIGS. 4(a) and 4(b), oil scraping-off plates 7 are attached to two parts (in the second axis C2 direction (two upper and lower parts in FIG. 2)) into which the pinion shaft 4 on the outer circumference of the differential case 3 is inserted. Here, as shown in FIG. 7, the oil scraping-off plate 7 includes a central attachment part 7A that is bent and molded into a substantially arc shape along the shape of the outer circumference of the differential case 3 and two blade-like left and right scraping-up parts 7B that extend substantially horizontally together from both sides of the attachment part 7A to the outside. A circular hole 7a into which the pinion shaft 4 is inserted is formed at the flat central part of the attachment part 7A.

Thus, the oil scraping-off plates 7 are attached to two parts on the outer circumference of the differential case 3 with the pinion shaft 4.

More specifically, as shown in FIG. 2, the pinion shaft 4 is separated into two pieces in the axial direction. Between two separate pieces 4A and 4B, a head 4a with a large diameter is integrally formed at one end (the upper end in FIGS. 5(a), 5(b)) of the one separate piece 4A in the axial direction, and a concave groove 4b having a circular hole is formed at the axial center of the other end (the lower end in FIGS. 5(a), 5(b)) in the axial direction. Here, a pin hole 4c having a circular hole shape penetrates through a part close to the head of the separate piece 4A in a direction orthogonal to the axis (the left to right direction in FIG. 5(b)).

In addition, at one end (the upper end in FIG. 6) of the other separate piece 4B in the axial direction, the head 4a with a large diameter is integrally formed, and a columnar convex part 4d integrally protrudes at the axial center of the other end in the axial direction (the lower end in FIG. 6). Here, the pin hole 4c having a circular hole shape penetrates through a part close to the head 4a of the separate piece 4B in a direction orthogonal to the axis (the left to right direction in FIG. 6(b)).

Incidentally, as shown in FIG. 2, when both separate pieces 4A and 4B of the pinion shaft 4 are inserted into the differential case 3, they are connected to each other by concave-convex fitting. That is, when the convex part 4d of the other separate piece 4B is fitted into the concave groove 4b of one separate piece 4A, both the separate pieces 4A and 4B are connected to each other in the axial direction, and the strength and rigidity required for the pinion shaft 4 are secured. Here, the oil scraping-off plates 7 are attached to two parts on the outer circumference of the differential case 3 by the separate pieces 4A and 4B of the pinion shaft 4 in the following manner.

That is, as shown in FIG. 3(a), flat mounting seats 3D to which the oil scraping-off plates 7 are attached are formed at two parts (two upper and lower parts in FIG. 3(a)) to which a circular hole 3b into which the pinion shaft 4 in the differential case 3 is inserted opens, and the flat central parts of the attachment parts 7A of the oil scraping-off plates 7 are brought into contact with the mounting seats 3D. Thus, the circular holes 7a formed at the attachment parts 7A of the scraping-off plates 7 and the circular holes 3b of the differential case 3 match, and the separate pieces 4A and 4B of the pinion shaft 4 pass through the circular holes 7a and 3b.

Next, when a retaining pin 8 is fitted (press-fitted) into pin holes 3c having a circular hole shape formed horizontally at parts close to the circular holes 3b of the differential case 3 (the direction orthogonal to the second axis C2) and the pin holes 4c of the separate pieces 4A and 4B matching the pin holes 3c, the separate pieces 4A and 4B of the pinion shaft 4 are attached to the differential case 3 with the retaining pin 8. Thus, the oil scraping-off plates 7 are interposed between the head 4a of the separate pieces 4A and 4B of the pinion shaft 4 and the mounting seat 3D (refer to FIG. 3(a)) of the differential case 3, and attached to two parts on the outer circumference of the differential case 3 (refer to FIG. 2, FIG. 3(b) and FIGS. 4(a), 4(b)). In this case, as shown in FIG. 2, both separate pieces 4A and 4B of the pinion shaft 4 are connected to each other when the convex part 4d of one separate piece 4B is fitted into the concave groove 4b of the other separate piece 4A.

In the differential device 1 configured as described above, when rotational power output from the engine 11 shown in FIG. 1 is input to the differential case 3 of the differential device 1 through the torque converter 12, the transmission 13, and the propeller shaft 14, the differential case 3 rotates around the first axis C1. Here, on a bottom of a housing (not shown) in which the differential device 1 is accommodated, as shown in FIGS. 4(a), 4(b), an amount of oil sufficient to immerse a part of the differential case 3 accumulates. Incidentally, when an amount of oil is too large, the oil is stirred and mixed due to rotation of the differential case 3 and thus the drag resistance particularly during high-speed rotation becomes large, and large power loss is caused. Therefore, an amount of oil that has accumulated on the bottom of the housing is minimized and the height of the oil level is reduced.

As described above, when the differential case 3 of which a part is immersed in oil that has accumulated on the bottom of the housing rotates around the first axis C1 in the arrow direction in FIGS. 4(a), 4(b), the oil scraping-off plates 7 attached to two parts on the outer circumference of the differential case 3 rotate together with the differential case 3. Therefore, the two oil scraping-off plates 7 are alternately immersed in oil that has accumulated on the bottom of the housing, and as shown in FIG. 4(a), oil is scraped up by the blade-like scraping-up part 7B whenever the differential case 3 rotates halfway. Then, as shown in FIG. 4(b), the scraped-up oil flows from the opening 3a that opens to both sides of the differential case 3 into the differential case 3, and is used to lubricate the pinion gear 5 and the side gears 6.

As described above, in the differential device 1 according to the present embodiment, since a natural oil supply system in which the oil scraping-off plates 7 are attached to the differential case 3, a lubricating oil that has accumulated on the bottom of the housing is scraped-up by the oil scraping-off plates 7 that rotate together with the differential case 3, and thus the scraped-up oil is supplied from the opening 3a formed at the differential case 3 into the differential case 3 and is used to lubricate respective parts is used, that is, since the inside of the differential case 3 is lubricated using rotation of an existing differential case 3, it is possible to simplify the lubrication structure and reduce costs compared to a forcible oil supply system using an oil pump.

In addition, in the present embodiment, since the oil scraping-off plates 7 are attached to the differential case 3 using an existing pinion shaft 4 (the separate pieces 4A and 4B), there is no need to provide a dedicated attachment part for attaching the oil scraping-off plates 7, the number of component is reduced, and it is possible to further simplify the structure of the differential device 1 and reduce costs.

Here, in the differential device 1, when the vehicle 10 shown in FIG. 1 travels straight ahead, since the left and right rear wheels WR receive the same resistance from the road surface, the pair of pinion gears 5 revolve together with the differential case 3, and rotational power is distributed and transmitted to the pair of left and right side gears 6. In this case, the pair of pinion gears 5 do not rotate (turn).

In addition, during cornering when the vehicle 10 turns, since a difference is generated between resistances received by the left and right rear wheels WR from the road surface (a difference in movement distance between the left and right rear wheels WR), the pair of pinion gears 5 turn, a rotational speed of one side gear 6 is higher than a rotational speed of the other side gear 6, and while the vehicle performs cornering smoothly, rotational power is distributed and transmitted to the left and right axles 2.

When a case in which the disclosure is applied to a differential device mounted in an FR vehicle using an engine as a driving source has been described above, the disclosure can also be applied to a differential device mounted in any other type of vehicle.

In addition, while an example in which two oil scraping-off plates are attached to the differential case has been described in the above embodiment, the number of oil scraping-off plates attached to the differential case and attachment parts are arbitrary, and can be freely selected.

In addition, application of the disclosure is not limited to the embodiment described above, and various modifications can be made without departing from the scope of the appended claims and the technical scope of the specification and drawings.

What is claimed is:

1. A differential device having a configuration in which a pinion shaft is inserted into and fixed to a differential case that is driven to rotate around a first axis in a second axis direction orthogonal to the first axis,
a pair of pinion gears that are rotatably supported by the pinion shaft and a pair of side gears that are respectively meshed with the pinion gears and are supported so that they are rotatable around the first axis are accommodated in the differential case, and
rotational power input from a driving source to the differential case is distributed to left and right drive wheels through a pair of left and right axles respectively connected to the pair of side gears,
wherein the at least one opening is formed at the differential case in a third axis direction orthogonal to the first axis and the second axis, and a plurality of oil scraping-off plates are attached to an outer circumference of the differential case in the second axis direction.

2. The differential device according to claim 1,
wherein the at least one opening comprises two openings formed at two opposing parts of the differential case, and the oil scraping-off plates are attached to two parts on an outer circumference of the differential case in a direction in which the pinion shaft is inserted.

3. The differential device according to claim 1,
wherein the oil scraping-off plates are attached to the differential case with the pinion shaft.

4. The differential device according to claim 2,
wherein the oil scraping-off plates are attached to the differential case with the pinion shaft.

5. The differential device according to claim 3,
wherein the pinion shaft is separated into two pieces in an axial direction, both of the separate pieces are connected to each other by concave-convex fitting, the oil scraping-off plates inserted into the separate pieces are interposed between a shaft end head of the separate pieces and the differential case, and are attached to the differential case.

6. The differential device according to claim 4,
wherein the pinion shaft is separated into two pieces in an axial direction, both of the separate pieces are connected to each other by concave-convex fitting, the oil scraping-off plates inserted into the separate pieces are interposed between a shaft end head of the separate pieces and the differential case, and are attached to the differential case.

7. The differential device according to claim 5,
wherein each of the separate pieces of the pinion shaft is fixed to the differential case with a retaining pin that is fitted into the differential case from a direction orthogonal to the separate pieces.

8. The differential device according to claim 6,
wherein each of the separate pieces of the pinion shaft is fixed to the differential case with a retaining pin that is fitted into the differential case from a direction orthogonal to the separate pieces.

* * * * *